United States Patent [19]

Bookbinder et al.

[11] Patent Number: 6,113,829

[45] Date of Patent: *Sep. 5, 2000

[54] METHOD OF FORMING AND SHAPING PLASTICIZED MIXTURES BY LOW TO MODERATE SHEAR EXTRUSION

[75] Inventors: Andrea W. Bookbinder, Corning; Devi Chalasani; Gregory P. Dillon, both of Painted Post; Kevin R. McCarthy; Brian E. Stutts, both of Horseheads; Michael E. Zak, Canandaigua, all of N.Y.

[73] Assignee: Corning Incorporated, Corning, N.Y.

[ * ] Notice: This patent is subject to a terminal disclaimer.

[21] Appl. No.: 09/115,929

[22] Filed: Jul. 15, 1998

Related U.S. Application Data

[60] Provisional application No. 60/057,693, Aug. 27, 1997, and provisional application No. 60/057,695, Aug. 27, 1997.

[51] Int. Cl.[7] .................................................. B29C 47/00
[52] U.S. Cl. ................ 264/211.11; 264/177.11; 264/177.12; 264/630; 264/631; 264/638; 264/639; 264/669; 264/670
[58] Field of Search ............................. 264/177.11, 630, 264/631, 669, 670, 638, 639, 177.12, 211.11

[56] References Cited

U.S. PATENT DOCUMENTS

| | | |
|---|---|---|
| 4,680,154 | 7/1987 | Matsubara et al. . |
| 5,019,537 | 5/1991 | Kato et al. . |
| 5,344,799 | 9/1994 | Wu . |
| 5,538,681 | 7/1996 | Wu . |
| 5,568,652 | 10/1996 | Wu . |
| 5,574,957 | 11/1996 | Barnard ..................................... 419/36 |
| 5,678,165 | 10/1997 | Wu . |

FOREIGN PATENT DOCUMENTS

| | | |
|---|---|---|
| 0 650 944 | of 1995 | European Pat. Off. . |
| 0 714 867 | of 1996 | European Pat. Off. . |
| 4-341787 | of 1992 | Japan . |

*Primary Examiner*—James Derrington
*Attorney, Agent, or Firm*—L. Rita Herzfeld

[57] ABSTRACT

A method for forming and shaping powder mixtures involves compounding, homogenizing, and plasticizing components to form a mixture. The components are powder materials, binder, solvent for the binder, surfactant, and non-solvent with respect to at least the binder, the solvent, and the powder materials. The non-solvent is lower in viscosity than the binder combined with the solvent. The components are chosen to result in improved wet green strength in the subsequently formed green body. The compounding is done by the steps of dry-mixing the powder material, surfactant and binder to form a uniform blend, adding the solvent to the resulting dry blend, and thereafter adding the non-solvent to the blend. The mixture is shaped by passing it through a low to moderate shear extruder, and then through a die to form a green body. The compounding and shaping steps are carried out at a temperature of no greater than ambient temperature. The method is especially suitable for RAM extrusion. Among the advantages, the method results in higher extrusion velocity, throughputs, and wet green strength, without increasing pressures and torques.

20 Claims, No Drawings

& nbsp;
METHOD OF FORMING AND SHAPING PLASTICIZED MIXTURES BY LOW TO MODERATE SHEAR EXTRUSION This application claims the benefit of U.S. Provisional Application Ser. No. 60/057,693, filed Aug. 27, 1997, entitled IMPROVED METHOD OF FORMING AND SHAPING PLASTICIZED MIXTURES BY THERMAL ACTIVATION OF THE PLASTICIZING BINDER; and Ser. No. 60/057,695, filed Aug. 27, 1997, entitled IMPROVED METHOD OF FORMING AND SHAPING PLASTICIZED MIXTURES BY MECHANICAL ACTIVATION OF THE PLASTICIZING BINDER, both by Devi Chalasani.

FIELD OF THE INVENTION

This invention relates to a method for forming and shaping stiff plasticized powder mixtures containing binder, binder-solvent, and surfactant, using low-to-moderate shear extrusion techniques. Increased plasticization for low-to moderate shear extrusion processes is accomplished by (1) providing a unique mixture composition that allows for less solvent to be used, (2) formulating the mixture and extruding at temperatures at or below ambient, and (3) increasing the shear rate by increasing the extrusion velocity and/or increasing the amount of total work input into the mixture. These features result in an increase in wet green strength of the extrudate without proportional increases in pressure or torque.

BACKGROUND OF THE INVENTION

Powder mixtures having a cellulose ether binder are used in forming articles of various shapes. For example ceramic powder mixtures are formed into honeycombs which are used as substrates in catalytic and adsorption applications. The mixtures must be well blended and homogeneous in order for the resulting body to have good integrity in size and shape and uniform physical properties. The mixtures have organic additives in addition to the binders. These additives can be surfactants, lubricants, and dispersants and function as processing aids to enhance wetting thereby producing a uniform batch.

A major and ongoing need in extrusion of bodies from highly filled powder mixtures, especially multicellular bodies such as honeycombs is to extrude a stiffer body without causing proportional increase in pressures. The need is becoming increasingly critical as thinner walled higher cell density cellular structures are becoming more in demand for various applications. Thin walled products with current technology are extremely difficult to handle without causing shape distortion.

Rapid-setting characteristics are important for honeycomb substrates. If the cell walls of the honeycomb can be solidified quickly after forming, the dimension of the greenware will not be altered in subsequent cutting and handling steps. This is especially true for a fragile thin-walled or complex shaped product, or a product having a large frontal area.

Prior rapid stiffening methods involve time-delayed stiffening using rapid set waxes as disclosed, for example in U.S. Pat. No. 5,568,652, and/or applying an external field such as an electrical, ultrasonic, or RF field at the die exit. All of these methods involve extrusion of soft batches. Historically, for highly filled ceramic mixtures, soft batches have lead to better extrusion quality. Attempts to extrude stiffer ceramic batches with the current batch components, i.e. cellulose ether binder, lowering the amount of water and/or additives such as sodium tallowate or sodium stearate have not been very successful because of the higher extrusion pressures resulting from collision of finer particles, and the abrasiveness of the materials involved.

The growing need for thinner webs (1–2 mil)/high density cellular products to be extruded to shape necessitates stiffening at the very instant the batch exits the die.

The present invention fills the need for instantaneous forming of stiff batches which is especially beneficial for extrusion of thin walled honeycombs, and shape retention of extruded bodies at the very instant the batch exits the die.

SUMMARY OF THE INVENTION

In accordance with one aspect of the invention, there is provided a method for forming and shaping powder mixtures involves compounding, homogenizing, and plasticizing components to form a mixture. The components are powder materials, binder, solvent for the binder, surfactant, and non-solvent with respect to at least the binder, the solvent, and the powder materials. The non-solvent is lower in viscosity than the binder combined with the solvent. The components are chosen to result in improved wet green strength in the subsequently formed green body. The compounding is done by the steps of dry-mixing the powder material, surfactant and binder to form a uniform blend, adding the solvent to the resulting dry blend, and thereafter adding the non-solvent to the blend. The mixture is shaped by passing it through a low to moderate shear extruder, and then through a die to form a green body. The compounding and shaping steps are carried out at a temperature of no greater than ambient or room temperature which is generally taken to be about 25° C.

The method is especially suitable for RAM extrusion.

Among the advantages, the method results in higher extrusion velocity, throughputs, and wet green strength, without increasing pressures and torques.

DETAILED DESCRIPTION OF THE INVENTION

This invention relates to a method for forming and shaping stiff plasticized powder mixtures containing a binder, solvent for the binder, surfactant, and a component in which at least the binder, its solvent, and the powder materials are essentially insoluble. This latter component is referred to as the non-solvent, although in actuality, there can be some solubility of the binder and the solvent in the non-solvent as long as the viscosity of the non-solvent is not changed significantly, and the gel that forms as a result of combining the binder and solvent does not become weak as a result of some dissolution in the non-solvent. It is preferred that the binder and its solvent be completely insoluble in the non-solvent. The combinations of mixture components result in improved wet green strength in the green body than otherwise occurs. Furthermore, this increase in wet green strength occurs without proportional increases in forming pressure or mixing torque. Also, in extrusion of the above mixtures, the shape of the extrudate or green body is retained at the very instant it exits the die, with no time delay.

Historically, a mixture or batch of a given composition can be made stiff by removing liquids. But extrusion of such stiff batches results in proportional increase in extrusion pressures and torque with enhanced flow defects such as e.g. swollen or deformed webs (in honeycombs). The method of the present invention enables forming e.g. extrusion of a stiff batch without adversely affecting performance such as pressures, torque, and the flow characteristics.

The method involves forming a stiff batch instantaneously during the plasticization stage of mixing the batch. Stiff batches are formed during plasticization by increasing the binder to solvent ratio in the batch. This is done by partial removal of the solvent which contributes plasticity to the batch. The batch is supplemented with a component in which at least the binder, the solvent, and the powder materials are essentially insoluble, which is termed the non-solvent. The non-solvent does not contribute plasticity to the batch. The non-solvent compensates for the lost solvent. The non-solvent provides the fluidity necessary for shaping, while maintaining stiff batches. This is unlike the solvent which provides both fluidity and acts as a medium for the binder to dissolve in, which results in a soft batch.

The increased stiffness is brought about by increasing the gel strength of the binder in the solvent and the batch. By gelling here is meant thickening that occurs when the binder and its solvent are combined. The gel strength of the binder is increased by increasing the weight ratio of the binder to the solvent by partial removal of the solvent from the batch that would historically be present.

Prior to this invention, if the solvent content were to be reduced, the binder and the batch would be deprived of solvent necessary for complete plasticization of the binder. This results in a very stiff strong binder gel in the solvent and in the batch. This increase in the effective concentration of the binder in the solvent would lead to a proportional increase in pressures, torques, and flow defects when these batches are shaped.

In the present invention, formability of the solvent-deprived stiff batches is enhanced by the use of the non-solvent. The non-solvent component of the batch provides the fluidity necessary for extrusion while maintaining the stiffness of the binder gel in the solvent. While not wishing to be bound by theory, it is believed that the formability is enhanced by the non-solvent being at two critical interfaces: (1) at the interface between the batch and the wall of the shaping apparatus, e.g. in extrusion this is the die/extruder wall, front end hardware (screen pack, homogenized flow control device), and (2) at the interfaces between the individual powder particles.

By highly filled mixtures is meant a high solid to liquid content in the mixture. For example, the powder material content in the mixture is typically at least about 45% by volume, and most typically at least about 55% by volume.

As mentioned previously, the components of the highly filled mixture or batch are (1) powders or mixtures of powders, (2) binder to bind the particles, (3) solvent for the binder which imparts plasticity (binder dissolves in the solvent to provide plasticity), (4) the non-solvent with respect to at least the binder, the solvent, and the powder materials, and (5) surfactant which functions as a lubricant/dispersant to disperse the powders in the plasticized mixture. When the binder dissolves in a solvent, the resulting gel is visco-elastic, i.e. the gel is characterized by an elastic component which is a measure of stiffness, and a viscous component which is a measure of the fluidity of the system. Elastic component is typical of a solid-like behavior, and viscous component is typical of a fluid-like behavior. In the present invention, partial removal of the solvent results in a significant improvement in the elastic component of the binder-solvent gel compared to historic batches.

The Powder Material

Typical powders are inorganics such as ceramic, glass ceramic, glass, molecular sieve, metal, or combinations of these.

The invention is especially suitable for use with ceramic, particularly with cordierite and/or mullite-forming raw material powders.

By ceramic, glass ceramic and glass ceramic powders is meant those materials as well as their pre-fired precursors. By combinations is meant physical or chemical combinations, e.g., mixtures or composites. Examples of these powder materials are cordierite, mullite, clay, talc, zircon, zirconia, spinel, aluminas and their precursors, silicas and their precursors, silicates, aluminates, lithium aluminosilicates, feldspar, titania, fused silica, nitrides, carbides, borides, e.g., silicon carbide, silicon nitride, soda lime, aluminosilicate, borosilicate, soda barium borosilicate or mixtures of these, as well as others.

Especially suited are ceramic materials, such as those that yield cordierite, mullite, or mixtures of these on firing, some examples of such mixtures being about 2% to about 60% mullite, and about 30% to about 97% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

In accordance with a preferred embodiment, one composition which ultimately forms cordierite upon firing is as follows in percent by weight, although it is to be understood that the invention is not limited to such: about 33–41, and most preferably about 34–40 of aluminum oxide, about 46–53 and most preferably about 48–52 of silica, and about 11–17 and most preferably about 12–16 magnesium oxide.

The powders can be synthetically produced materials such as oxides, hydroxides, etc., or they can be naturally occurring minerals such as clays, talcs, or any combination of these. The invention is not limited to the types of powders or raw materials. These can be chosen depending on the properties desired in the body.

Some typical kinds of powder materials are given below. The particle size is given as median particle diameter by Sedigraph analysis, and the surface area is given as $N_2$ BET surface area.

Some types of clay are non-delaminated kaolinite raw clay, such as Hydrite MP™ clay, or Hydrite PX™ clay, delaminated kaolinite, such as KAOPAQUE-10™ (K10) clay, and calcined clay, such as Glomax LL. All of the above named materials are sold by Dry Branch Kaolin, Dry Branch, Ga.

Some typical kinds of talc are those having a surface area of about 5–8 $m^2$/g, such as supplied by Barretts Minerals, under the designation MB 96-67.

Some typical aluminas are coarse aluminas, for example, Alcan C-700 series, such as C-701™, or fine aluminas such as A-16SG from Alcoa.

One typical kind of silica is that having a particle size of about 9–11 micrometers, and a surface area of about 4–6 $m^2$/g, such as IMSIL™ sold by Unimin Corporation.

In filter applications, such as in diesel particulate filters, it is customary to include a burnout agent in the mixture in an amount effective to subsequently obtain the porosity required for efficient filtering. A burnout agent is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are graphite, cellulose, flour, etc.

Elemental particulate carbon is preferred. Graphite is especially preferred because it has the least adverse effect on the processing. In an extrusion process, for example, the rheology of the mixture is good when graphite is used. Typically, the amount of graphite is about 10% to about 30%, and more typically about 15% to about 30% by weight based on the powder material.

Molecular sieves can also be shaped into bodies in accordance with this invention. Molecular sieves are crystalline substances having pores of size suitable for adsorbing molecules. The molecular sieve can be in the crystallized form or in the ammonium form or hydrogen form, or ion-exchanged with or impregnated with a cation. The molecular sieves can be provided in ion exchanged form or impregnated with cations either before forming into a body or after the product body has formed. The ion-exchange and impregnation methods are well known processes. Such treatments are within the scope of this invention.

Some types of molecular sieves which are preferred for the practice of the present invention are carbon molecular sieves, zeolites, metallophosphates, silicoaluminophosphates, and combinations of these. Carbon molecular sieves have well defined micropores made out of carbon material.

The molecular sieves that are especially suited to the invention are the zeolites. Some suitable zeolites are pentasil, such as ZSM-5, Y, such as ultrastable Y, beta, mordenite, X, such as 13X, or mixtures thereof.

Any sinterable metal or metal composition can be used in the practice of the present invention. Especially suited are iron group metal, chromium, and aluminum compositions, with the preferred iron group metal being iron. Especially preferred is Fe, Al, and Cr. For example, Fe5–20Al5–40Cr, and Fe7–10Al10–20Cr powders with other possible additions are especially suited. Some typical compositions of metal powders are disclosed in U.S. Pat. Nos. 4,992,233, 4,758,272, and 5,427,601 which are herein incorporated by reference as filed. U.S. Pat. No. 4,992,233 relates to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5–40 chromium, about 2–30 aluminum, 0–about 5 of special metal, 0–about 4 of rare earth oxide additive and the balance being iron group metal, and unavoidable impurities such as e.g., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

In general, the powder material is fine powder (in contrast to coarse grained materials) some components of which can either impart plasticity, such as clays, when mixed with water for example, or which when combined with the organic binder can contribute to plasticity.

The weight percents of the binder, solvent, and non-solvent are calculated as superadditions with respect to the non-organic solids by the following formula:

$$\frac{\text{weight of binder, solvent, non-solvent,}}{\text{weight units of powder materials}} \times 100.$$

The Binder

The function of the binder is to bind the inorganic powders and impart plasticity to the batch when mixed with a solvent. The preferred binders used in this invention are aqueous based, that is, capable of hydrogen bonding with polar solvents. Examples of binders are cellulosics, starches, poly(vinyl alcohol), poly(vinyl pyrrolidone), gums such as guar gum, xanthan gum, carageenan, etc., alginates, polyethylene oxides, polyamides, and/or polyacrylates. A combination of binder and cross-linking agent can also be used as a binder component (e.g. polyvinyl alcohol with borax, polyacrylates with poly(vinyl alcohol). Hydrophobically modified aqueous binders can also be used.

Especially useful in the practice of this invention are cellulose ether binders for aqueous systems.

Some typical cellulose ether binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M celloluse products from Dow Chemical Co. Methocel A4M cellulose is a methylcellulose. Methocel F4M, F240, and K75M cellulose products are hydroxypropyl methylcellulose.

The properties of preferred cellulose ether binders such as methylcellulose are water retention, water solubility, surface activity or wetting ability, thickening of the mixture, providing wet and dry green strength to the green bodies, thermal gelation and hydrophobic association in an aqueous environment. Cellulose ether binders that promote hydrophobic association with the non-solvent and hydrogen bonding interaction with the solvent are desirable. Examples of substituent groups that provide hydrophobic association with the non-solvent are methoxy, propoxy, and butoxy groups. These substituents which provide the hydrophobic association also contribute to the gel strength of the binder. The substituent groups that maximize the hydrogen bonding interaction with polar solvents e.g. water, are hydroxypropyl and hydroxyethyl groups, and to a smaller extent hydroxybutyl groups. This combination of properties enables binders to be at the interface between the solvent and non-solvent.

Cellulose ethers that provide especially good hydrophobic-hydrophilic balance are hydroxypropyl methylcellulose, hydroxyethylcellulose, hydroxyethyl methylcellulose, a combination of hydroxyethyl or hydroxypropyl with methyl, ethyl, propyl, and butyl cellulose.

The distribution (random vs. blocking) of the substituent groups along the polymer chain also plays a critical role in determining the gel strength of the binder. Blocky substitution contributes to higher gel strength relative to random substitution.

Gel strength increases also with an increase in concentration of the binder in the solvent. The increase in concentration of the binder in the solvent lowers the thermal gelation temperature.

The organic binder makes up typically about 2–12% by weight, and more typically about 2–4% by weight of the powder materials.

The Solvent

The solvent provides a medium for the binder to dissolve in thus providing plasticity to the batch and wetting of the powders. The solvent can be aqueous based, which are normally water or water-miscible solvents; or organically based. Most useful are aqueous based solvents which provide hydration of the binder and powder particles.

The Non-Solvent

The non-solvent is not a solvent for at least the binder, the solvent, and the powder materials. The non-solvent is lower in viscosity than the binder-solvent combination. Partial solubility of cellulose ether binders in the non-solvent would result in increase of viscosity of the non-solvent, and loss of lubricating properties needed to shape a stiff batch. This would result in an increase in shaping pressures and torques. The function of the non-solvent is to provide the fluidity necessary for shaping, while maintaining the strength of the binder in the solvent. The non-solvent can have dissolved surfactants, secondary binders, lubricants, and additives that enhance the Theological performance. The amount of dissolved substances should be so as to not adversely impact the rheology of the mixture.

In case of an aqueous binder system, the non-solvent is hydrophobic relative to binder in the solvent e.g. water. One preferred binder-solvent combination is cellulose ether in water. In this combination, the non-solvent hydrophobically associates through the methyoxy substituent of the binder. This combination is especially advantageous for cordierite and/or mullite-forming raw material powders.

With aqueous-based binder solvents, such as water, non solvents can be chosen from both synthetic and natural substances.

Examples of such non-solvents are hydrocarbons, silicones, fluorine compounds, phosphate esters, esters, liquid $CO_2$, supercritical fluids e.g. supercritical $CO_2$, and hot water at a temperature above the thermal gelation temperature for a given cellulose ether, and combinations of these. When hot water is used as a non-solvent, it is in combination with at least one other non-solvent component.

Examples of useful hydrocarbons are alkanes, alkenes, alkynes, cycloaliphatics, synthetic lubricant base stocks (industrial, automotive, agricultural), polyolefins, and aromatics. Examples of these types of materials are paraffinic oils, e.g. mineral oil, hydrogenated polybutenes, alpha olefins, internal olefins, polyphenyl ethers, polybutenes, and polyisobutylene.

Examples of esters are synthetic mono and diesters, and natural fatty acid esters (glycerides). Examples of mono and diesters are adipates, phthalates, polyol esters such as trimethylolpropane, and pentaerythritol. Examples of fatty acid esters are natural plant and animal glycerides such as soybean oil, sunflower, palm, corn, coconut, cottonseed, castor oil, peanut oil, essential oils (rose, jasmine, orange, lime, etc.) soya fatty acid, tallow, bacon grease, lard, and fish oil.

Non-solvents can also be solids as long as they are processed at or above the melt point of the solid. For example, fatty acids and fatty alcohols of carbon chain length greater than 22 can be used alone or in combination with other non-solvent components.

Some especially useful non-solvents are hydrocarbons, fatty acids having greater than 22 carbon atoms in their chains, fatty alcohols having greater than 22 carbon atoms in their chains, natural esters having 14 or more carbon atoms in their chains, synthetic esters, and combinations of these.

More advantageous non-solvents are mineral oil, fatty acid glycerides, monoesters, diesters, and combinations of these.

Most preferred are light mineral oil, corn oil, high molecular weight polybutenes, polyol esters, a blend of light mineral oil and wax emulsion, a blend of paraffin wax in corn oil, and combinations of these.

The solvent for the binder can also be made to function as a partial non-solvent and a partial solvent for the binder through use of additives in the batch. For example, in the case of aqueous based solvents such as water and a cellulose ether binder, additives that have greater affinity for water than for the cellulose ether binder, dehydrate the cellulose ether. The additives can be used to shift the solvent-nonsolvent character of the water. The extent of dehydration is dependent on the additive concentration. The solvent/non-solvent balance of water can be adjusted with the type and concentration of additives such as glycerin, corn syrup, maple syrup, sucrose, sorbitol, and electrolytes such as the salts of alkali and alkaline earth metals.

The Surfactant

The surfactant plays an important role in determining the interfacial properties between the inorganic powders, between the inorganics and organics, and between the components of the organic system. The surfactant has the greatest influence in determining the gel strength of the binder, adhesion of the binder gel to the inorganics, and adhesion of the non-solvent to the binder. It promotes emulsification between the solvent and non-solvent. The preferred surfactants co-exist with the binder at the interface between the solvent and non-solvent. In the formed mixture, the surfactant is at least partially miscible in both the solvent and the non-solvent. It disperses/wets the inorganic powders.

Typically, the surfactant is suitable if, by itself without other substances, it is insoluble in the solvent at room temperature.

Some surfactants that can be used in the practice of the present invention are $C_8$ to $C_{22}$ fatty acids and/or their derivatives. Additional surfactant components that can be used with these fatty acids are $C_8$ to $C_{22}$ fatty esters, $C_8$ to $C_{22}$ fatty alcohols, and combinations of these. Preferred surfactants are stearic, lauric, oleic, linoleic, palmitoleic acids, and their derivatives, stearic acid in combination with ammonium lauryl sulfate, and combinations of all of these. Most preferred surfactants are lauric acid, stearic acid, oleic acid, and combinations of these. An especially preferred non-solvent for use with this latter group of surfactants is light mineral oil.

Examples of some typical batch compositions are given in Table 1 below.

TABLE 1

|  | 1 | 2 | 3 |
|---|---|---|---|
| Talc 96-67 | 40.78 | 40.79 | 40.86 |
| Glomax LL | 26.48 | 27 | 29.71 |
| Hydrite MP | 15.37 | — | — |
| K-10 | — | 14.82 | 11.69 |
| Alcan C701 | 15.34 | 15.4 | — |
| A-16 | — | — | 15.74 |
| IMSIL | 2.03 | 2 | 2 |
| METHOCEL (F240) | 2.7 | 2.7 | 2.7 |
| STEARIC ACID | 0.6 | 0.6 | 0.6 |
| LIGHT MINERAL OIL | 9.2 | 9.2 | 9.2 |
| WATER (%) | 23–24 | 23–24 | 23–24 |

The main interactions contributing to stiffness are the interactions of the binder with the (1) solvent, (2) surfactant, (3) surfactant-solvent, (4) inorganics-solvent, and (5) inorganics-surfactant-solvent.

Binder-Solvent

Stiffening from the binder-solvent interaction is observed when the concentration of the binder in the solvent is increased. The binder concentration can be increased by partial removal of the solvent or by further increasing the amount of binder. In this invention, increasing the binder concentration is done typically by partial removal of the solvent. When the solvent is partially removed, the binder is deprived of the solvent necessary for complete plasticization. This results in a very strong binder gel which is very stiff and not overly plastic. Binding of the inorganic particles with the strong binder gel results in a very stiff batch.

Binder-Surfactant and Binder-Surfactant-Solvent

The type and amount of surfactant is important in determining the amount of solvent required to plasticize the binder. If the surfactant makes the binder too soluble in the solvent, it results in a weak gel. A weak gel can also be formed when the surfactant hinders the binder (chemically, mechanically, or thermally) from solubilizing in the solvent. This leads to an unplasticized batch.

Binder-Inorganics-Solvent and Binder-Inorganics-Surfactant-Solvent

The type and concentration of inorganics also has an impact on the total liquid demand, which in turn affects the amount of solvent available to the binder. Also, the type of surfactant plays a significant role in dispersing the particles and affects the total solvent demand for the batch.

Some useful mixture compositions are in percent by weight based on the powder materials, about 2% to 50% non-solvent, about 0.2% to 10% surfactant, about 2% to 10% cellulose ether binder, and about 6% to 50% water. More advantageous mixture compositions are in percent by weight based on the powder materials, about 5% to 10% non-solvent, about 0.2% to 2% surfactant, about 2.5% to 5%C cellulose ether binder, and about 8% to 25% water. It is to be understood that for powder materials of very high surface area, e.g. >20 $m^2/g$, more water is required. However, according to this invention, the amount of water needed is less than the amount that would be needed otherwise.

Batch-Forming Mechanics

For best results, to ensure batch homogeneity and plasticization, the sequence of addition of the various batch components is important. It is preferred that batch formation take place in two stages prior to the shaping step.

In the first stage or wetting stage of batch formation, the powder particles, surfactant, and binder are dry mixed followed by addition of the solvent such as in a muller or Littleford mixer. The solvent is added in an amount that is less than is needed to plasticize the batch. With water as the solvent, the water hydrates the binder and the powder particles. The non-solvent is then added to the mix to wet out the binder and powder particles. The non-solvent typically has lower surface tension than water. As a result, it wets out the particles much more readily than the solvent. At this stage, the powder particles are coated and dispersed by the surfactant, solvent, and non-solvent.

It is preferred that plasticization take place in the second stage. In this stage the wet mix from the first stage is sheared in any suitable mixer in which the batch will be plasticized, such as for example in a twin-screw extruder/mixer, auger mixer, muller mixer, or double arm, etc. Extent of plasticization is dependent on the concentration of the components (binder, solvent, surfactant, non-solvent and the inorganics), temperature of the components, the amount of work put in to the batch, the shear rate, and extrusion velocity. During plasticization, the binder dissolves in the solvent and a gel is formed. The gel that is formed is stiff because the system is very solvent-deficient. The surfactant enables the binder-gel to adhere to the powder particles. The non-solvent partially migrates to the exterior of the particle agglomerates (inter-particle region) and to the interface between the batch and the walls of the vessel containing it, e.g. mixer, or extruder, or die wall. This results in a batch that is stiff in its interior and lubricated on its exterior.

Thus the batch is a system of particles separated by the solvent/surfactant/non-solvent bound/glued with the binder gel which is further coated with a film of the non-solvent and surfactant. Without wishing to be bound by theory, it is thought that the most important part of the system is for the binder/surfactant to co-exist at the interface between the solvent and the non-solvent lubricating fluid. The binder and the surfactant at the interface hydrogen-bond with the solvent and hydrophobically associate with the non-solvent. If the surfactant displaces the binder from the interface, it results in a soft batch or an unplasticized batch.

The extrusion is done with devices that provide low to moderate shear. For example hydraulic ram extrusion press, which is the preferred device, or two stage de-airing single auger are low shear devices. A single screw extruder is a moderate shear device. The extrusion can be vertical or horizontal.

As the stiff batch is passed through the extruder and the die, the film of lubricating fluid in the inter-particle region and at the interface between the batch and the extruder/die wall provides the lubrication necessary to maintain lower extrusion pressures for a stiff batch. If the mixing process is not high shear in the second or plasticization stage (e.g., as in a muller mixer, double arm or Auger or RAM), the plasticization will occur during extrusion through the die because the batch is subjected to high shear the first time through the die, e.g. in forming a honeycomb, through the slots and holes. Batch plasticization in the die is not desirable because it usually results in honeycombs with extrusion defects such as swollen webs, missing webs etc.

This invention provides a method in low shear plasticization processes where plasticity is enhanced thermally by mixing batch components and extruding at temperatures at or below ambient. Preferably the batch is cooled to below room temperature, typically to <15° C. The binder hydration is significantly enhanced below room temperature versus room temperature and above used in twin screw extrusion. The enhanced ability of the binder to solvate at the lower temperatures enables the batch to plasticize and promotes the hydrophobic non-solvent fluid to partially migrate to the batch-mixer interface. Secondly, a higher concentration of binder is used in low shear plasticization than with twin screw extrusion batches without proportional increase in pressure; and that, in combination with the lower temperatures, enables hydration of the binder for extrusion. The relative amount of binder to solvent was increased by decreasing the solvent from the historical amount of about 30–32 wt. % to about 20–22 wt. % in the batch. This reduction in solvent increases the binder to solvent weight ratio from the current 12–13 to 14–15. Thirdly, the low shear homogenization and plasticization can be enhanced by multiple passes of the batch through the extruder, as through a synthetic die or a honeycomb di before the batch is extruded to form the final green extrudate product.

The total extrusion pressure through the die is composed of the pressure to enter the die and the pressure drop through the die. The higher entrance pressure due to the stiff batch is offset by a much larger pressure drop through the die. As a result, the total extrusion pressure through the die is no greater than it would be in historic batches.

The lubrication provided by the non-solvent enables the stiff batch to slip at the wall of the die/extruder. As the stiff batch is extruded, at points of high shear through the die, the non-solvent is partially squeezed out of the batch to the interface between the batch and the wall of the die/extruder. The driving force for the preferential migration of the non-solvent versus solvent to the interface is due to (1) the viscosity of the non-solvent being significantly lower than the viscosity of the binder-solvent gel or mixture, (2) the non-solvent being incompatible with the solvent, i.e. hydrophobic relative to it in the case of aqueous based solvents, and (3) the solvent being held by the binder and inorganics by hydration as opposed to the non-solvent which is free to migrate.

An unexpected benefit of this invention is that shaping e.g. extrusion can be done at significantly lower temperatures than was previously possible.

The extrudability benefits of this invention are (1) cell orthogonality at the perimeter of the shaped body, and (2) smooth skin.

The stiff batches of this invention exhibit good shape retention at the die. In the case of multicellular structures, the cell orthogonality at the perimeter of the part closer to the skin is greatly improved.

A component of extrudability that is affected by the stiff batches is skin deterioration. Very stiff batches at lower extrusion velocities (<1.52 cm/sec or <0.6'/sec) tend to diverge and split apart as the batch exits the die. Skin deterioration can be overcome by increasing the shear rate during plasticization. Shear rate can be increased in the process by increasing the extrusion velocity. In the RAM, extrusion velocity can be increased by increasing the piston speed.

The higher shear rate/extrusion velocity is the driving force for the non-solvent to partially migrate to the batch-wall interface providing smooth skin. Very stiff batches from this invention show superior smooth skin flow at higher extrusion velocities, that is >1.52 cm/sec (>0.6'/sec).

Furthermore, the invention provides a method in which cellulose ether binders (in water as the solvent) can be processed with higher gel strength at higher velocities (throughputs). This is in direct contrast to the historical batches where the higher throughput capability was achieved through the use of cellulose ethers with low gel strength, which translates to drying blisters during dielectric drying.

Another advantage of the present invention is that it provides a means to instantaneously increase wet green strength without an associated increase in mixing torque or extrusion pressure characteristic of historical methods. That is, for a given extrusion pressure or torque, the present invention provides markedly higher wet green strength. This is a key to improving the extrusion capability of thin web, high cell density substrates. The corollary of this attribute is that a reduction in extrusion pressure can be realized for a given green wet strength. This is an important advantage because it makes higher throughputs possible. In general, the maximum throughput is limited by the power density that can be generated by the extruder. In historic methods as water is removed from the batch the green wet strength increases and throughput can be increased by increasing the extrudate velocity, but eventually a point is reached where the extruder can no longer generate sufficient pressure and thus the throughput limit is reached. The present invention reduces the extrusion pressure and torque such that a significantly higher throughput can be realized before the pressure limit of the extruder is reached. This means that for a given product, even those where an increase in green wet strength is not needed, e.g., in honeycombs with relatively thick walls, such as about 0.14 mm (7 mils) or greater, the present invention enables a higher maximum throughput when compared to historic methods. This increase offers the potential to both increase production capacity and reduce production costs.

Still another advantage of the invention is that it decreases the wear on the extrusion die, and screw elements, thus extending their life.

The present invention is especially advantageous for PAM extrusion of honeycombs at velocities of typically about 2.54–12.7 cm/sec (1–5"/sec).

The bodies of this invention can have any convenient size and shape and the invention is applicable to all processes in which plastic powder mixtures are shaped. The process is especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Generally honeycomb densities range from about 235 cells/cm$^2$ (1500 cells/in$^2$) to about 15 cells/cm$^2$ (100 cells/in$^2$). Examples of honeycombs produced by the process of the present invention, although it is to be understood that the invention is not limited to such, are those having about 94 cells/cm$^2$ (about 600 cells/in$^2$), or about 62 cells/cm$^2$ (about 400 cells/in$^2$) each having wall thicknesses of about 0.1 mm (4 mils). Typical wall thicknesses are from about 0.07 to about 0.6 mm (about 3 to about 25 mils), although thicknesses of about 0.02–0.048 mm (1–2 mils) are possible with better equipment. The method is especially suited for extruding thin wall/high cell density honeycombs.

The intrinsic material stiffness or wet green strength of this invention is typically about 2–2.5 times greater than with historic mixtures.

In addition to the stiffness of the batches, another important advantage of this invention is that there is improved shape retention of the green body. Shape retention is especially advantageous in forming complex structures. Shape of thin-wall cellular substrates e.g. 3–6 mil or less, is maintained at higher extrusion velocities for RAM extrusion.

Stiffening is important for honeycombs having a large frontal area. For example, honeycombs of typically about 12.7–22.9 cm (5–9") diameter and lower cell density and very thin walls, e.g. 0.07–0.12 mm (3–5 mils) are more vulnerable to deformation as they leave the extrusion die. In accordance with this invention, there is no cell distortion at the perimeter, and there is significant improvement in shape. Therefore the rapid stiffening effects of the present invention are especially advantageous for those types of structure:

The extrudates can then be dried and fired according to known techniques except that drying times will be shorter due to less water in the extrudate. Also, less drying energy is required than for historic batches. This is especially advantageous in dielectric drying operations.

The firing conditions of temperature and time depend on the composition and size and geometry of the body, and the invention is not limited to specific firing temperatures and times. For example, in compositions which are primarily for forming cordierite, the temperatures are typically from about 1300° C. to about 1450° C., and the holding times at these temperatures are from about 1 hour to about 6 hours. For mixtures that are primarily for forming mullite, the temperatures are from about 1400° C. to about 1600° C., and the holding times at these temperatures are from about 1 hour to about 6 hours. For cordierite-mullite forming mixtures which yield the previously described cordierite-mullite compositions, the temperatures are from about 1375° C. to about 1425° C. Firing times depend on factors such as kinds and amounts of materials and nature of equipment but typical total firing times are from about 20 hours to about 80 hours. For metal bodies, the temperatures are about 1000° C. to 1400° C. in a reducing atmosphere preferably hydrogen. Firing times depend on factors as discussed above but are typically at least 2 hours and typically about 4 hours. For zeolite bodies, the temperatures are about 400° C. to 1000° C. in air. Firing times depend on factors as discussed above but are typically about 4 hours.

To more fully illustrate the invention, the following non-limiting examples are presented. All parts, portions, and this percentages are on a weight basis unless otherwise stated.

The parameters used for comparing the examples of this invention to historical batches are extrusion pressures of a rod and ribbon, and ribbon stiffness (Load/Deformation (L/D)). The batches are mixed in a torque rheometer/Brabender and extruded through a capillary rheometer into rods and ribbons.

The intrinsic material stiffness or wet green strength used in this invention is referred to as the Load versus Deformation (L/D). Stiffness (L/D) was measured by first extruding ribbons about 3.1 mm (⅛") thick using a capillary rheometer. The ribbon stiffness was then measured by applying a load to a piston at a given velocity and measuring the deformation of the ribbon. The ratio of the load to deformation is a measure of intrinsic material stiffness. The higher the L/D, the stiffer the batch.

A second measure of stiffness used for measuring the wet strength of honeycombs is referred to as the ball drop stiffness. The ball drop test was carried out using a Fischer Scientific Penetrometer which was adapted for this test. A ball of a given weight which is fastened to the bottom of the plunger rod is released and allowed to drop onto the test sample. The indentation made by the ball on the sample is measured. The degree of indentation is an indication of the stiffness or lack thereof of the sample. Lower ball drop numbers at a given load correspond to stiffer batches, with numbers less than about 80 being considered a stiff batch.

The results are summarized in Tables 2, 3, 4 and 5 for each composition.

Table 2 shows the comparison of extrusion pressure and the material stiffness obtained in this invention vs. the historic batches. The historic or non-inventive batch is referred to as the "Control." The results show that the extrusion pressure of rods and ribbons are equal to or lower than the control within experimental error. The material stiffness (L/D) of this invention is 2X times greater than the control. In other words, this invention allows a stiffer batch to be extruded at equivalent or lower extrusion pressures to the control.

Table 3 shows stiffness and deformation data that is representative of inventive as well as non-inventive examples for extruded wet honeycombs, e.g. 62 cells/cm$^2$ with 0.1 mm thick wall (400 cells/in$^2$ and 4 mil wall), measured at the very instant the batch exited the die. Table 3 shows that the inventive batches are stiffer as shown by lower ball drop numbers and are extruded with lower extrusion pressure than the control batches. Furthermore, the cell collapse at the perimeter of the honeycomb showed significant improvement over the non-inventive example.

Table 4 shows an example of a non-solvent phase which comprises of light mineral oil and paraffin wax emulsion. Comparison of the extrusion pressures and the ball drop stiffness shows the current inventive batch to be much stiffer than the control while maintaining lower extrusion pressure.

The fired properties of the material from the present invention are compared to the control in Table 5. A significant change in the physical properties was observed in porosity. An unusual aspect of this invention is that an increase in porosity is observed over historical batches without a proportional decrease in MOR, and with no significant changes in thermal expansion.

TABLE 2

Capillary Rheometer Evaluation

| Extrusion | Control | | This Invention | |
|---|---|---|---|---|
| Parameters | Talc 96-67 | 40.86 | Talc 96-97 | 40.86 |
| | Calcined clay | 32.6 | Calcined clay | 32.6 |
| | Hydrous clay | 12.82 | Hydrous clay | 12.82 |
| | A-16 SG (Alumina) | 13.72 | A-16 SG (Alumina) | 13.72 |
| | Methocel F240 | 4.0 | Methocel F240 | 3.0 |
| | Sodium Stearate | 1.0 | Stearic Acid | 1.0 |
| | Water | 29.5 | Water | 23 |
| | | | Light mineral oil | 12 |
| Rod Extrusion | | | | |
| Pressure (Kg) | | 249 | | 201 |
| Ribbon Extrusion | | | | |
| Pressure (Kg) | | 144 | | 146 |
| Stiffness measurements (L/D, Kg/mm) | | | | |
| Load (Kg) | | 2.07 | | 2.52 |
| Deformation (mm) | | 1.17 | | 0.7 |
| Stiffness Load/Deformation (L/D, Kg/mm) | | 1.76 | | 3.6 |
| L/D - Stdev. (n = 5) | | 0.06 | | 0.27 |

Data applicable to large ram extrusion (62 cells/cm$^2$, .096 mm thick wall, 10.16 cm diameter)
Raw materials mixed in a torque rheometer @ <15° C.

TABLE 3

Ram Stiffening Round Honeycomb

| Extrusion Comments | Control | | This Invention | | |
|---|---|---|---|---|---|
| Parameters | Talc 96-67 | 40.86 | Talc 96-97 | 40.86 | |
| | Calcined clay | 32.6 | Calcined clay | 32.6 | |
| | Hydrous clay | 12.82 | Hydrous clay | 12.82 | |
| | A-16 SG (Alumina) | 13.72 | A-16 SG (Alumina) | 13.72 | |
| | F240 | 4.0 | F240 | 3.0 | |
| | Sodium Stearate | 1..0 | Stearic Acid | 1.0 | |
| | Water | 30.3 | Water | 22.8 | |
| | | | Light mineral oil | 11.6 | |
| Pre-extrusion Pressure | 2100–2350 | | 1700–2000 | | lower pressure with inventive sample |
| Stiffness Die 1 Ball drop (100 g LOAD) | | | | | |
| (first piece = @ die) | 106,96, 114,107, 109 | | 62,66, 68,69 | | more stiffness with inventive sample |
| (last piece of the push) Die 2 | 89 | | 62,57, 66,67 | | |
| (first piece = @ die) | 115,117, 115 | | 66,66, 56 | | more stiffness with inventive sample |
| (last piece of the push) | 98,97 | | 51,59, 61 | | |

All inorganics screened to –200 mesh
62 cells/cm$^2$, .096 mm wall, 10.16 cm diameter Tables 4 and 5 show also that inventive batches are stiffer as shown by the lower ball drop numbers and are extruded with less pressure than the control batches.

TABLE 4

| Ingredients | Control Percent | This invention Percent |
|---|---|---|
| Inorganics | | |
| Talc 96-67 | 40.86 | 40.86 |
| Calcined clay | 32.6 | 32.6 |
| Hydrous clay | 12.82 | 12.82 |
| A-16 SG (Alumina) | 13.72 | 13.72 |
| Organics | | |
| Methocel F240 | 4 | 4 |
| Sodium Tallowate | 1 | — |
| Stearic acid | — | 0.5 |
| Light Mineral oil | — | 14 |
| Paraffin wax emulsion | — | 1 |
| Water | 31 | 18 |
| Extrusion (Web thickness - 0.02 cm, Mask –2.54 cm)) | | |
| Die Pressure (psi) | 920 | 680 |
| Ball drop Stiffness (× 10–3 mm) | 43,46, 46,45, 46 | 27,37, 27,33 |

TABLE 5

INTRINSIC MATERIAL PROPERTIES of FIRED SUBSTRATES

| PHYSICAL PROPERTIES | CONTROL | | THIS INVENTION | |
|---|---|---|---|---|
| | TALC 96-67 | 39 | TALC 96-67 | 39 |
| | Calcined clay | 15 | Calcined clay | 15 |
| | Hydrous clay | 20 | Hydrous clay | 20 |
| | Alcan A17 | 10.5 | Alcan A17 | 10.5 |
| | Al-trihydrate | 10.5 | Al trihydrate | 10.5 |
| | Imsil | 5.0 | Imsil | 5.0 |
| | A4M | 4.0 | F240 | 4.0 |
| | Sodium stearate | 1.0 | Stearic acid | 1.75 |
| | Water | 25 | Water | 18.0 |
| | | | Light mineral Oil | 7.0 |
| CTE*10–7/° C. | 5.0 | | 3.9 | |
| MOR (psi) | 3398 ± 184 | | 3194 ± 59 | |
| % Total Porosity | 30.1 | | 34.7 | |
| Median Pore size (um) | 2.67 | | 2.0 | |

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for forming and shaping powder mixtures, the method comprising:

a) compounding, homogenizing, and plasticizing components to form a mixture, the components comprising powder materials, binder, aqueous based solvent for the binder, surfactant, and non-solvent with respect to at least the binder, the solvent, and the powder materials, wherein the non-solvent is lower in viscosity than the binder combined with the solvent, the components being chosen to result in improved stiffness in the subsequently formed mixture and green body, the compounding being done by the steps of
   i) dry-mixing the powder material, surfactant and binder to form a uniform blend thereof,
   ii) adding the solvent to the resulting dry blend, and thereafter
   iii) adding the non-solvent to the blend resulting from step ii; and b) shaping the mixture resulting from step a by passing the mixture through a low to moderate shear extruder, and then through a die to form a green body, wherein steps a and b are carried out at a temperature of no greater than ambient temperature.

2. A method of claim 1 wherein the components in step a are maintained at a temperature no greater than about 15° C.

3. A method of claim 1 wherein the mixture is shaped by being passed through a RAM extruder.

4. A method of claim 3 wherein the mixture is passed through a RAM extruder at a RAM speed that is greater than it would be absent the binder, solvent, non-solvent, and surfactant, and compounding of claim 1, step a.

5. A method of claim 1 wherein the solvent is water.

6. A method of claim 1 wherein the binder comprises a cellulose ether.

7. A method of claim 6 wherein the cellulose ether is selected from the group consisting of methylcellulose, methylcellulose derivatives, and combinations thereof.

8. A method of claim 6 wherein the binder comprises a cellulose ether, and the solvent is water.

9. A method of claim 8 wherein the binder comprises additional components selected from the group consisting of starch, poly(vinyl alcohol), poly(acrylic acid), and combinations thereof.

10. A method of claim 1 wherein the non-solvent comprises components selected from the group consisting of hydrocarbons, fatty acids with chain length of greater than $C_{22}$, fatty alcohols with chain length of greater than $C_{22}$, natural esters with chain length of $C_{14}$ or greater, synthetic esters, and combinations thereof.

11. A method of claim 10 wherein the non-solvent comprises components selected from the group consisting of mineral oil, fatty acid glycerides, monoesters, diesters, and combinations thereof.

12. A method of claim 10 wherein the non-solvent comprises components selected from the group consisting of light mineral oil, corn oil, high molecular weight polybutenes, polyol esters, wax emulsion-light mineral oil blend, and combinations thereof.

13. A method of claim 8 wherein the non-solvent comprises water, the water having dissolved additives selected from the group consisting of sugar, glycerin, and combinations thereof.

14. A method of claim 1 wherein the surfactant comprises components selected from the group consisting of fatty acids of $C_8$ to $C_{22}$ chain length, derivatives of fatty acids of $C_8$ to $C_{22}$ chain length, and combinations thereof.

15. A method of claim 14 wherein the surfactant is selected from the group consisting of stearic acid, stearic acid and ammonium lauryl sulfate, lauric acid, oleic acid, and combinations thereof.

16. A method of claim 14 wherein the surfactant comprises additional components selected from the group consisting of fatty esters of $C_8$ to $C_{22}$ chain length, fatty alcohols of $C_8$ to $C_{22}$ chain length, and combinations thereof.

17. A method of claim 1 wherein the non-solvent is light mineral oil and the surfactant is selected from the group consisting of lauric acid, stearic acid, oleic acid, and combinations thereof.

18. A method of claim 8 wherein when the binder is a cellulose ether and the solvent is water, for a given powder material, the pressure of the mixture entering the die is higher than it would be and the wall shear stress through the die is lower than it would be absent the binder, solvent, non-solvent, and surfactant of claim 1, step a, whereby the total extrusion pressure is no greater than it would be absent the binder, solvent, non-solvent, and surfactant of claim 1, step a.

19. A method of claim 1 wherein for a given extrusion pressure, the wet green strength of the green body is greater than it would be absent the binder, solvent, non-solvent, and surfactant, and compounding of claim 1, step a.

20. A method of claim 1 wherein for a given wet green strength produced in the green body, the extrusion pressure needed to produce said given wet green strength is lower than it would be absent the binder, solvent, non-solvent, and surfactant, and compounding of claim 1, step a, whereby the throughput is greater than it would be absent the binder, solvent, non-solvent, and surfactant, and compounding of claim 1, step a.

* * * * *